(No Model.)
N. TESLA.
ELECTRICAL TRANSMISSION OF POWER.
No. 511,559. Patented Dec. 26, 1893.
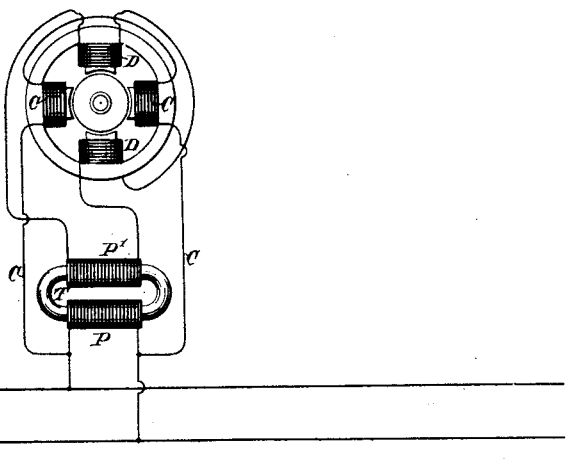
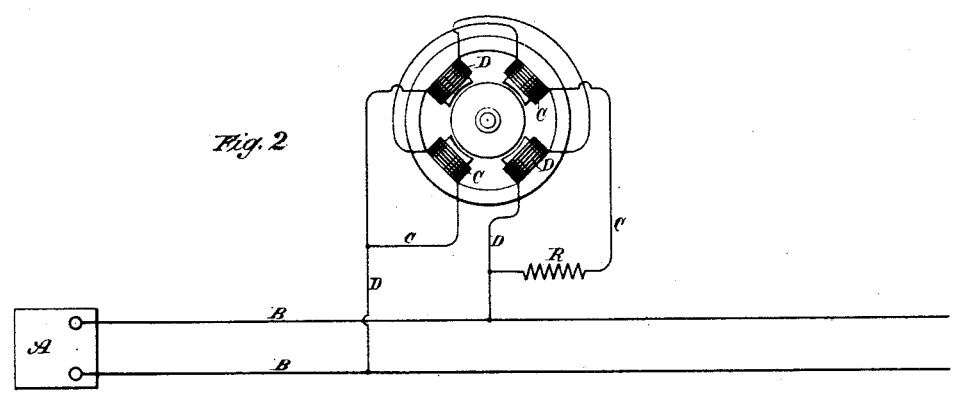
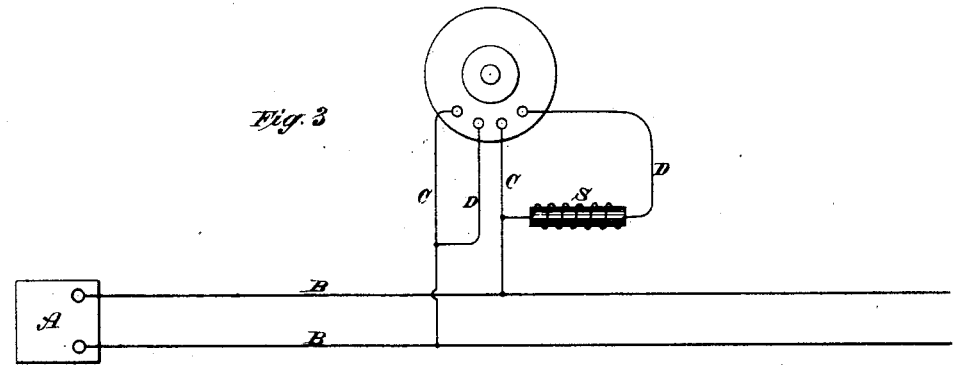
WITNESSES:
Raphaël Netter
Ernest Hopkinson
INVENTOR
Nikola Tesla
BY
Duncan, Curtis & Page
ATTORNEYS.

UNITED STATES PATENT OFFICE.

NIKOLA TESLA, OF NEW YORK, N. Y., ASSIGNOR TO THE TESLA ELECTRIC COMPANY, OF SAME PLACE.

ELECTRICAL TRANSMISSION OF POWER.

SPECIFICATION forming part of Letters Patent No. 511,559, dated December 26, 1893.

Application filed December 8, 1888. Serial No. 293,051. (No model.)

*To all whom it may concern:*

Be it known that I, NIKOLA TESLA, a subject of the Emperor of Austria-Hungary, from Smiljan, Lika, border country of Austria-Hungary, residing at New York, in the county and State of New York, have invented certain new and useful Improvements in the Electrical Transmission of Power, of which the following is a specification, reference being had to the drawings accompanying and forming a part of the same.

In certain patents heretofore granted, I have shown and described a system of electrical power transmission, in which each motor contained two or more independent energizing circuits through which were caused to pass alternating currents, having in each circuit such a difference of phase that by their combined or resultant action they produced a rotary progression of the poles or points of maximum magnetic effect of the motor and thereby maintained the rotation of its movable element. In the system referred to and described in said patents, the production or generation of the alternating currents upon the combined or resulant action of which the operation of the system depends, is effected by the employment of an alternating current generator with independent induced circuits which, by reason of the winding or other construction of the generator produced currents differing in phase, and these currents were conveyed directly from the generator to the corresponding motor coils by independent lines or circuits. I have, however, discovered another method of operating these motors, which dispenses with one of the line circuits and enables me to run the motors by means of alternating currents from a single original source.

Broadly stated this invention consists in passing alternating currents, obtained from one original source, through both of the energizing circuits of the motor, and retarding the phases of the current in one circuit to a greater or less extent than in the other.

The distribution of current between the two motor circuits may be effected by induction or by derivation. In other words, I may pass the alternating current from the source through one energizing circuit and induce by such current a second current in the other energizing circuit. Or, on the other hand, I may connect up the two energizing circuits of the motor in derivation or multiple arc with the main circuit from the source. In either event I make due provision for maintaining a difference of phase between the currents in the two circuits or branches.

In carrying out my invention I have used various means for securing this result. For example, when I induce a current in one of the circuits from the current flowing in the other, I employ a form of converter or bring the two circuits into such inductive relations as will produce the necessary difference of phase. Or, when I obtain the two energizing currents by derivation, I make the two circuits of different degrees of self induction by inserting a resistance or a self induction coil in one of said circuits, or I combine these devices in different ways as I shall more specifically describe hereinafter.

The accompanying drawings to which I now refer in further illustration of my invention, are a series of diagrams illustrating, not the specific construction of the particular devices which I may or may not have used, but rather, the electrical connections and relations to be adopted in carrying out the present system by means of devices which are now well known.

Figure 1 is a diagram illustrating the method of operating the motors by inducing one of the energizing currents by the other. Fig. 2 is a similar diagram of the method of operating the motors where the two energizing currents are obtained by derivation from a single source. Fig. 3 is a modified application of this principle.

Referring to Fig. 1 let A represent the source of alternating currents which are to be utilized in operating the motor or motors. It will be understood that considered as a source of current it may be either a primary or secondary generator.

B B designate the conductors of the circuit which convey the alternating currents to one or more motors. The motor has two energizing circuits or sets of coils C D. One of these circuits as C is connected directly with the circuit B. The other set of coils as D, is connected up in the secondary circuit of an electrical transformer or induction coil T. The primary coil P of this transformer, is included in the circuit B. The alternations of current in the circuit B tend to establish in their passage through the coils C, a polarity at right angles to that set up by the coils D, and if the currents in the two sets of coils accorded in their phases, no rotary effect would be produced. But the secondary current developed in the coil P' of the transformer, will lag behind that in the primary which lag or retardation may be increased as I have shown in another application, to a sufficient extent to practically obtain the same result as though two independent alternating currents were used to energize the motor.

In Fig. 2 the two energizing circuits of the motor are shown connected in multiple arc to the circuit B B, and in one of these circuits is a resistance R. Assuming the two motor circuits to have the same self induction and resistance no rotary effect will be produced by the passage through them of an alternating current from the source A. But if one of the motor circuits, as C, be varied or modified by the introduction of a dead resistance R, the self-induction of that circuit or branch is reduced, and the phases of current therein retarded to a correspondingly less extent. The relative degrees of retardation of the phases of the current in the two motor circuits with respect to those of the unretarded current in the circuit B thus produced, will set up a rotation of the motor which may be practically utilized for many purposes.

In Fig. 3, the arrangement of the parts is similar to that shown in Fig. 2, except that a self-induction coil as S is introduced into one branch or energizing circuit of the motor. The effect of thus increasing the self-induction in one of the circuits is to retard the phases of the current passing therein to a greater extent than in the other circuit, and in this way to secure the necessary difference in phase between the two energizing currents to produce the rotation of the motor.

In an application filed, of even date herewith, I have shown and described other ways of accomplishing this result, among which may be noted the introduction of a resistance capable of variation in each motor circuit, or the use of a resistance in one circuit and a self-induction coil in the other.

In the above description I have referred mainly to motors with two energizing circuits, but it is evident that the invention applies equally to those in which there are more than two of such circuits, the adaptation of the same being a matter well understood by those skilled in the art.

I do not claim in this application the specific devices employed by me in carrying out the invention, having made these the subjects of other applications.

What I claim herein is—

1. The method of operating motors having independent energizing circuits, as herein set forth, which consists in passing alternating currents through both of the said circuits and retarding the phases of the current in one circuit to a greater or less extent than in the other.

2. The method of operating motors having independent energizing circuits, as herein set forth, which consists in directing an alternating current from a single source through both circuits of the motor and varying or modifying the relative resistance or self-induction of the motor circuits and thereby producing in the currents differences of phase, as set forth.

NIKOLA TESLA.

Witnesses:
FRANK E. HARTLEY,
FRANK B. MURPHY.